(12) United States Patent
Kim et al.

(10) Patent No.: US 12,494,254 B2
(45) Date of Patent: Dec. 9, 2025

(54) MEMORY DEVICE AND METHOD OF MANAGING TEMPERATURE OF THE SAME

(71) Applicant: SK hynix Inc., Gyeonggi-do (KR)

(72) Inventors: Jee Yul Kim, Gyeonggi-do (KR); Jung Ae Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 161 days.

(21) Appl. No.: 18/339,240

(22) Filed: Jun. 22, 2023

(65) Prior Publication Data

US 2024/0203505 A1 Jun. 20, 2024

(30) Foreign Application Priority Data

Dec. 20, 2022 (KR) .................. 10-2022-0179805

(51) Int. Cl.
*G11C 16/10* (2006.01)
*G11C 16/08* (2006.01)
*G11C 16/28* (2006.01)
*G11C 16/34* (2006.01)

(52) U.S. Cl.
CPC ............ *G11C 16/102* (2013.01); *G11C 16/08* (2013.01); *G11C 16/28* (2013.01); *G11C 16/3459* (2013.01)

(58) Field of Classification Search
CPC ....... G11C 16/102; G11C 16/08; G11C 16/28; G11C 16/3459

USPC ................................................ 365/189.011
See application file for complete search history.

(56) References Cited

U.S. PATENT DOCUMENTS

| 2019/0035443 | A1* | 1/2019 | Park | ................ | G11C 11/4076 |
| 2022/0122641 | A1* | 4/2022 | Kim | ................ | G06F 11/3058 |

FOREIGN PATENT DOCUMENTS

| KR | 10-2012-0101914 A | 9/2012 |
| KR | 10-2020-0126533 A | 11/2020 |

* cited by examiner

*Primary Examiner* — Amir Zarabian
*Assistant Examiner* — Daniel John King
(74) *Attorney, Agent, or Firm* — IP & T GROUP LLP

(57) ABSTRACT

The present technology relates to an electronic device. According to the present technology, a memory device may include a memory block including a plurality of memory cells, a peripheral circuit configured to generate operation voltages for the plurality of memory cells and transfer the operation voltages to the memory block through bit lines and word lines, and a control logic configured to control, based on temperature information of the memory device, the peripheral circuit to perform a low temperature management operation of increasing a temperature of the memory device. The peripheral circuit may transfer the operation voltages while limiting transferal of a local word line apply voltage to be applied to the memory block through the word lines in response to the low temperature management operation, the local word line apply voltage being included in the operation voltages.

19 Claims, 6 Drawing Sheets

MEMORY DEVICE AND METHOD OF MANAGING TEMPERATURE OF THE SAME

CROSS-REFERENCE TO RELATED APPLICATION

The present application claims priority under 35 U.S.C. § 119(a) to Korean patent application number 10-2022-0179805 filed on Dec. 20, 2022, the entire disclosure of which is incorporated by reference herein.

BACKGROUND

1. Field of Invention

Various Embodiments of the present disclosure relate to an electronic device, and more particularly, to a memory device and a method of managing a temperature of the same.

2. Description of Related Art

A memory system includes a storage device and a host (i.e., an external device) such as a computer or a smartphone. The storage device may include a memory device for storing data and a memory controller for controlling the memory device. The memory device may be a volatile memory device or a nonvolatile memory device.

The volatile memory device is a memory device that stores data only when power is supplied and loses the stored data when the power supply is cut off. The volatile memory device includes a static random access memory (SRAM), a dynamic random access memory (DRAM), or the like.

The nonvolatile memory device is a memory device that retain data even though power is cut off. The nonvolatile memory device includes a read only memory (ROM), a programmable ROM (PROM), an electrically programmable ROM (EPROM), an electrically erasable and programmable ROM (EEPROM), a flash memory, or the like.

Performance of the memory device may be affected by a temperature. The memory device may perform a thermal management operation of managing the temperature of the memory device to maintain predetermined performance.

SUMMARY

An embodiment of the present disclosure provides a memory system and a method of managing a temperature of the same for increasing a temperature of a memory device by performing a background operation.

According to an embodiment of the present disclosure, a memory device may include a memory block including a plurality of memory cells, a peripheral circuit configured to generate operation voltages for the plurality of memory cells and transfer the operation voltages to the memory block through bit lines and word lines, and a control logic configured to control, based on temperature information of the memory device, the peripheral circuit to perform a low temperature management operation of increasing a temperature of the memory device, based on temperature information of the memory device. The peripheral circuit may transfer the operation voltages while limiting transferal of a local word line apply voltage to be applied to the memory block through the word lines in response to the low temperature management operation, the local word line apply voltage being included in the operation voltages.

According to an embodiment of the present disclosure, a storage device may include a memory device configured to perform a low temperature management operation, which is an operation of increasing a temperature of the memory device, based on temperature information of the memory device, and a memory controller configured to control background operations of the memory device related to the low temperature management operation. The memory device may include a memory block including a plurality of memory cells, a peripheral circuit configured to generate operation voltages for the plurality of memory cells and transfer the operation voltages to the memory block through bit lines and word lines, and a control logic configured to control the peripheral circuit to perform a low temperature management operation based on the temperature information of the memory device. The peripheral circuit may transfer the operation voltages while limiting, based on the command, transferal of a local word line apply voltage applied to the memory block through the word lines among the operation voltages, in response to the low temperature management operation. The local word line apply voltage are included in the operation voltages for the low temperature management operation.

According to an embodiment of the present disclosure, a method of operating a memory device may include performing, based on temperature information of the memory device, a low temperature management operation of increasing a temperature of the memory device, generating operation voltages for a plurality of memory cells included in the memory device, and transferring the operation voltages to the plurality of memory cells through bit lines and word lines. Transferring may include limiting transferal of a local word line apply voltage to be transferred through the word lines in response to the low temperature management operation. The local word line apply voltage are included in the operation voltages.

According to an embodiment of the present disclosure, a method of operating a memory device may include sensing a temperature thereof and performing, based on the sensed temperature, a dummy operation of adjusting the temperature by applying a dummy voltage to a first word line and a bit line voltage to a bit line while blocking the dummy voltage to a second word line. The first and second word lines and the bit line are coupled to a memory cell array.

According to the present technology, a memory system and a method of operating the same for increasing a temperature of a memory device without stressing memory cells may be provided.

DETAILED DESCRIPTION

Specific structural or functional descriptions of embodiments according to the concept which are disclosed in the present specification are illustrated only to describe the embodiments according to the concept of the present disclosure. The embodiments according to the concept of the present disclosure may be carried out in various forms and should not be construed as being limited to the embodiments described in the present specification.

Figure 1:
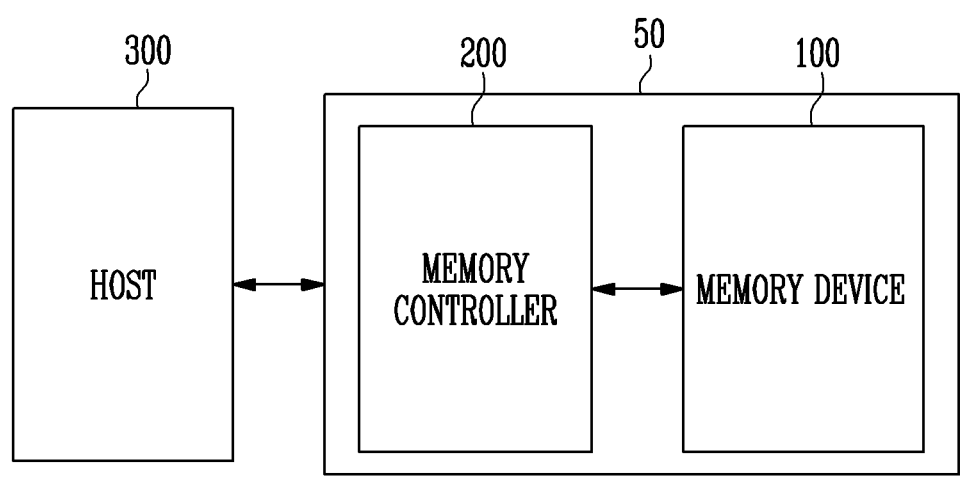
FIG. 1 is a diagram illustrating a memory system including a memory device according to an embodiment of the present disclosure.

FIG. 1 is a diagram illustrating a memory system including a memory device 100 according to an embodiment of the present disclosure.

Referring to FIG. 1, the memory system may include a host and a storage device 50. The storage device 50 may include the memory device 100 and a memory controller 200 that controls an operation of the memory device 100. The storage device 50 may be a device that stores data under control of a host 300 such as a smartphone, a laptop computer, a desktop computer, a game player, a TV, a tablet PC, or an in-vehicle infotainment system.

The storage device 50 may be manufactured as one of various types of storage devices according to a host interface that is a communication method with the host 300. For example, the storage device 50 may be configured as any of various types of storage devices such as an SSD, a multi-media card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory international association (PCM-CIA) card type storage device, a peripheral component interconnection (PCI) card type storage device, a PCI express (PCI-E) card type storage device, a compact flash (CF) card, a smart media card, and a memory stick.

The storage device 50 may be manufactured as any of various types of packages. For example, the storage device 50 may be manufactured as any of various package types, such as a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data. The memory device 100 may operate under control of the memory controller 200. The memory device 100 may include a memory cell array including a plurality of memory cells.

The memory cell array may include a plurality of memory blocks. Each memory block may include a plurality of memory cells.

One memory block may include a plurality of pages. In an embodiment, the page may be a unit for storing data in the memory device 100 or reading data stored in the memory device 100. The memory block may be a unit for erasing data.

In an embodiment, the memory device 100 may be a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), a spin transfer torque random access memory (STT-RAM), or the like. In the present specification, for convenience of description, the memory device 100 is a NAND flash memory.

The memory device 100 may be configured to receive a command and an address from the memory controller 200 and access an area selected by the address in the memory cell array. The memory device 100 may perform an operation instructed by the command on the area selected by the address. For example, the memory device 100 may perform a program operation, a read operation, and an erase operation. During the program operation, the memory device 100 may store data in the area selected by the address. During the read operation, the memory device 100 may read data from the area selected by the address. During the erase operation, the memory device 100 may erase data stored in the area selected by the address.

In an embodiment, the memory device 100 may perform a background media scan (BGMS) operation. The BGMS operation may be performed in an idle time when the command is not received from the memory controller 200. The memory device 100 may perform a refresh operation by selecting a page with a high possibility of a read failure based on a result of the BGMS operation. The memory device 100 may perform a refresh operation to read data stored in the page with the high probability of the read failure and store the read data in another page.

As the refresh operation is performed, a temperature of the memory device 100 may be increased. In an embodiment of the present disclosure, the memory device 100 may maintain the temperature of the memory device 100 higher than a minimum temperature, at which an operation is possible, by performing a dummy operation.

The memory device 100 may detect a page that has potentially uncorrectable error correction codes (UECC) due to read disturb and retention, and manage data stored in the detected page, thereby improving reliability of data stored in the memory device 100.

The memory controller 200 may control an overall operation of the storage device 50.

When power is applied to the storage device 50, the memory controller 200 may execute firmware (FW). When the memory device 100 is a flash memory device, the firmware may include a host interface layer (HIL) that controls communication with the host 300, a flash translation layer (FTL) that controls communication between the host 300 and the memory device 100, and a flash interface layer (FIL) that controls communication with the memory device 100.

The memory controller 200 may receive write data and the LBA from the host 300 and may convert the LBA into a physical block address (PBA) indicating an address of memory cells in which data included in the memory device 100 is to be stored. In the present specification, the LBA and a "logic address" or a "logical address" may be used as having the same meaning. In the present specification, the PBA and a "physical address" may be used as having the same meaning.

The memory controller 200 may control the memory device 100 to perform the program operation, the read operation, the erase operation, or the like according to a request from the host 300. During the program operation, the memory controller 200 may provide a program command, the PBA, and data to the memory device 100. During the read operation, the memory controller 200 may provide a read command and the PBA to the memory device 100. During the erase operation, the memory controller 200 may provide an erase command and the PBA to the memory device 100.

In an embodiment, the memory controller 200 may generate a command, an address, and data independently regardless of the request from the host 300 and transmit the command, the address, and the data to the memory device 100. For example, the memory controller 200 may provide the command, the address, and the data for performing a read operation and program operations accompanying in performing wear leveling, read reclaim, garbage collection, and the like, to the memory device 100.

The buffer memory may temporarily store data provided from the host 300, that is, data to be stored in the memory device 100, or may temporarily store data read from the memory device 100. In an embodiment, the buffer memory may be a volatile memory device. For example, the buffer memory may be a dynamic random access memory (DRAM) or a static random access memory (SRAM).

The host 300 may communicate with the storage device 50 using at least one of various communication standards or such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multi-media card (MMC), an embedded MMC (eMMC), a dual in-line memory module (DIMM), a registered DIMM (RDIMM), and a load reduced DIMM (LRDIMM). In an embodiment of the present disclosure, the host 300 may be connected to the storage device 50 through a system management bus (SM-BUS) or inter integrated circuit (I2C) communication.

Figure 2:
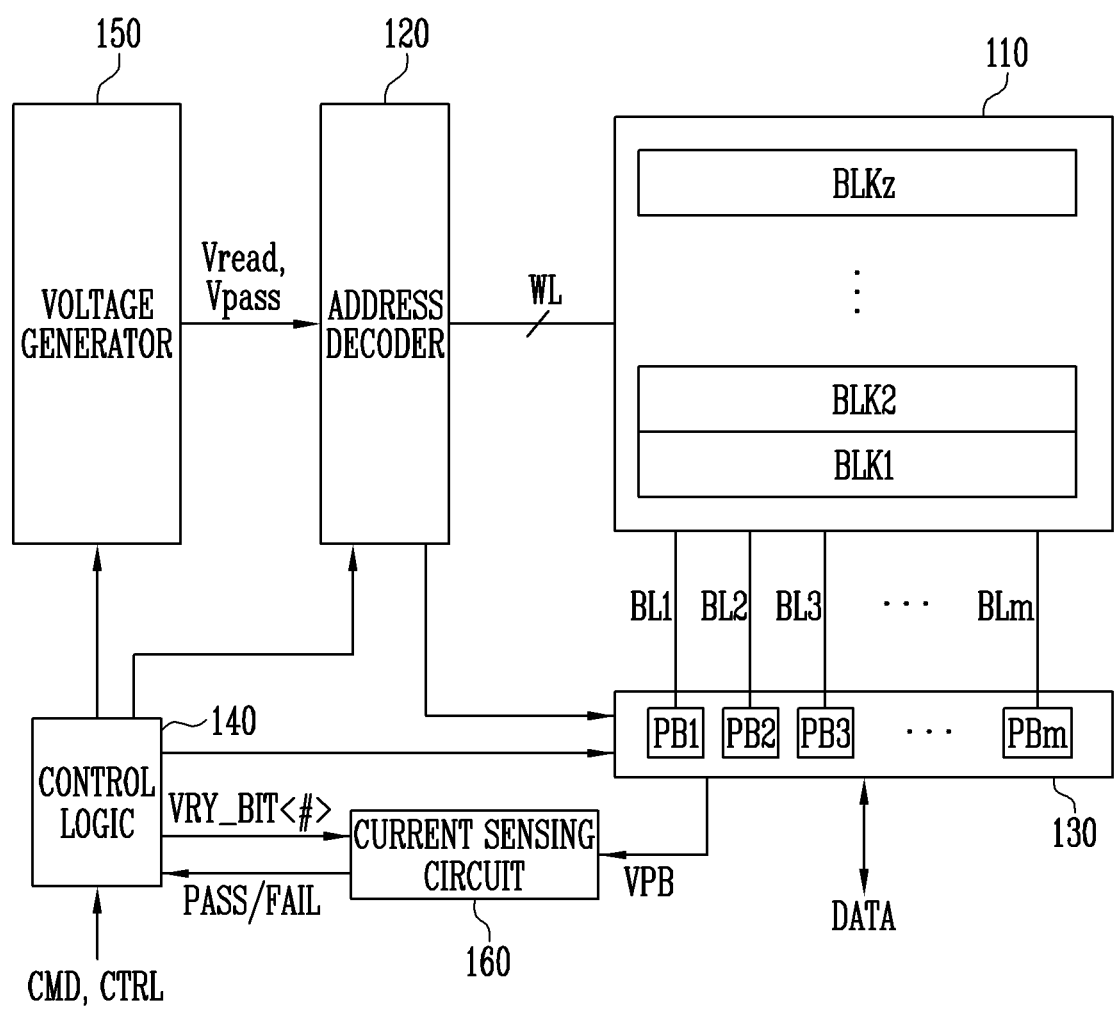
FIG. 2 is a detailed diagram illustrating the memory device of FIG. 1.

FIG. 2 is a detailed diagram illustrating the memory device 100 of FIG. 1.

Referring to FIG. 2, the memory device 100 may include a memory cell array 110, an address decoder 120, a read and write circuit 130, a control logic 140, a voltage generator 150, and a current sensing circuit 160. The address decoder 120, the read and write circuit 130, the voltage generator 150, and the current sensing circuit 160 may be referred to as a peripheral circuit controlled by the control logic 140.

The memory cell array 110 may include a plurality of memory blocks BLK1 to BLKz. The plurality of memory blocks BLK1 to BLKz may be connected to the address decoder 120 through word lines WL. The plurality of memory blocks BLK1 to BLKz may be connected to the read and write circuit 130 through bit lines BL1 to BLm. Each of the plurality of memory blocks BLK1 to BLKz may include a plurality of memory cells.

Each of the plurality of memory cells included in the memory cell array may store at least one bit of data. In an embodiment, each of the plurality of memory cells included in the memory cell array 110 may be a single-level cell (SLC) capable of storing one bit of data. In another embodiment, each of the plurality of memory cells included in the memory cell array 110 may be a multi-level cell (MLC) capable of storing two bits of data. In still another embodiment, each of the plurality of memory cells included in the memory cell array 110 may be a triple-level cell (TLC) capable of storing three bits of data. In still another embodiment, each of the plurality of memory cells included in the memory cell array 110 may be a QLC storing four bits of data. According to an embodiment, the memory cell array 110 may include a plurality of memory cells each storing five or more bits of data.

The address decoder 120 may be connected to the memory cell array 110 through the word lines WL. The address decoder 120 may be configured to operate in response to control of the control logic 140. The address decoder 120 may receive an address through an input/output buffer inside the memory device 100.

The address decoder 120 may be configured to decode a block address among received addresses. The address decoder 120 may select at least one memory block according to the decoded block address. In addition, the address decoder 120 may apply a read voltage Vread generated in the voltage generator 150 to a selected word line of the selected memory block at a time of a read voltage application operation during a read operation, and apply a pass voltage Vpass to the remaining unselected word lines. In addition, during a program verify operation, the address decoder 120 may apply a verify voltage generated in the voltage generator 150 to the selected word line of the selected memory block, and apply the pass voltage Vpass to the remaining unselected word lines.

The read operation and the program operation of the memory device 100 may be performed in a page unit. Addresses received at a time of a request of the read operation and the program operation may include a block address, a row address, and a column address. The address decoder 120 may select one memory block and one word line according to the block address and the row address. The column address may be decoded by the address decoder 120 and may be provided to the read and write circuit 130. In the present specification, memory cells connected to one word line may be referred to as a "physical page".

The read and write circuit 130 may include a plurality of page buffers PB1 to PBm. The read and write circuit 130 may operate as a "read circuit" during the read operation of the memory cell array 110 and may operate as a "write circuit" during the write operation of the memory cell array 110. The plurality of page buffers PB1 to PBm may be connected to the memory cell array 110 through the bit lines BL1 to BLm. During the read operation and the program verify operation, in order to sense a threshold voltage of the memory cells, the plurality of page buffers PB1 to PBm may sense a change of an amount of a current flowing according to a programmed state of a corresponding memory cell through a sensing node while consecutively supplying a sensing current to the bit lines connected to the memory cells, and latch the sensed change as sensing data. The read and write circuit 130 may operate in response to page buffer control signals output from the control logic 140. During the read operation, the read and write circuit 130 may sense data of the memory cell, temporarily store read data, and output data to the input/output buffer of the memory device 100.

The control logic 140 may be connected to the address decoder 120, the read and write circuit 130, the voltage generator 150, and the current sensing circuit 160. The control logic 140 may receive the command CMD and a control signal CTRL through the input/output buffer of the memory device 100. The control logic 140 may be configured to control overall operations of the memory device 100 in response to the control signal CTRL. In addition, the control logic 140 outputs a control signal for adjusting a sensing node pre-charge potential level of the plurality of page buffers PB1 to PBm. The control logic 140 may control the read and write circuit 130 to perform the read operation of the memory cell array 110.

The control logic 140 may determine whether a verify operation on a specific target program state is passed or failed in response to a pass signal PASS or a fail signal FAIL received from the current sensing circuit 160.

The voltage generator 150 generates the read voltage Vread and the pass voltage Vpass during the read operation in response to the control signal output from the control logic 140. In order to generate a plurality of voltages having various voltage levels, the voltage generator 150 may include a plurality of pumping capacitors that receive an internal power voltage. The voltage generator 150 may generate the plurality of voltages by selectively activating the plurality of pumping capacitors in response to the control of the control logic 140.

The current sensing circuit 160 may generate a reference current and a reference voltage in response to a permission bit VRY_BTI<#>received from the control logic 140 during a verify operation. A pass signal PASS or a fail signal FAIL may be output by comparing the generated reference voltage with a sensing voltage VPB received from the page buffers PB1 to PBm included in the read and write circuit 130 or comparing the generated reference current with a sensing current received from the page buffers PB1 to PBm included in the read and write circuit 130.

The address decoder 120, the read and write circuit 130, the voltage generator 150, and the current sensing circuit 160 may function as the "peripheral circuit" that performs the read operation, the write operation, and the erase operation on the memory cell array 110. The peripheral circuit may perform the read operation, the write operation, and the erase operation on the memory cell array 110 based on the control of the control logic 140.

In an embodiment of the present disclosure, the peripheral circuit may increase the temperature of the memory device 100 by performing the dummy operation on the memory cell array 110. The control logic 140 may manage the temperature of the memory device 100 by controlling the peripheral circuit based on temperature information of the memory device 100.

Figure 3:
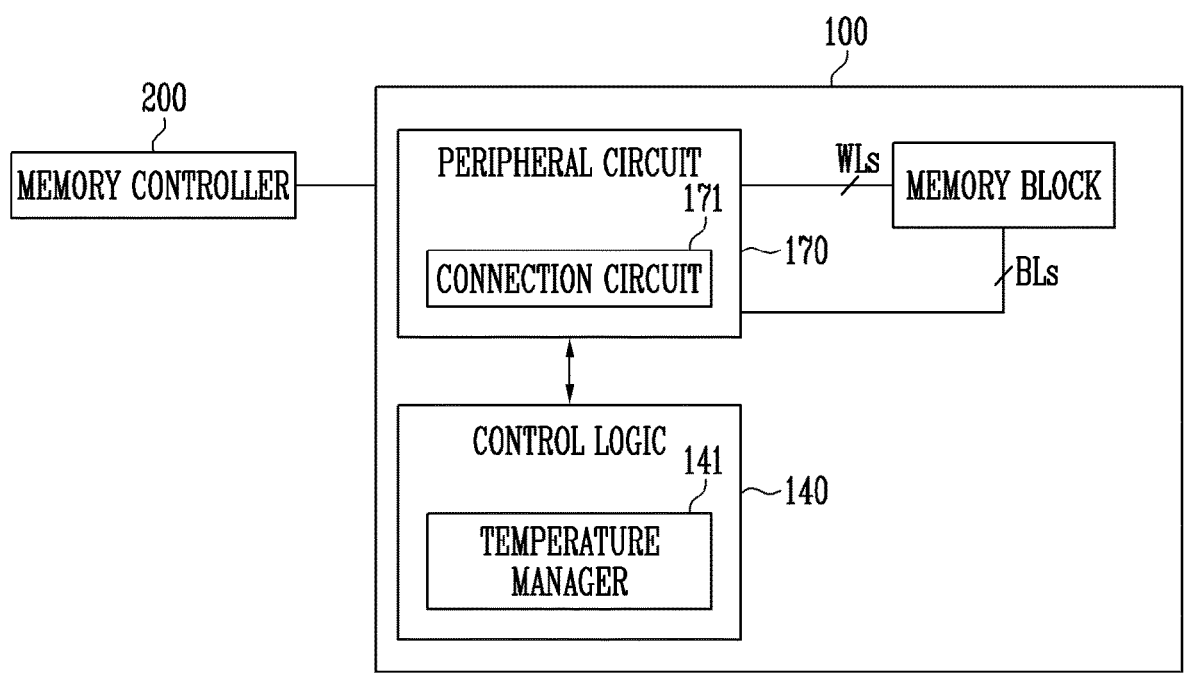
FIG. 3 is a block diagram for describing a method of performing a low temperature management operation according to an embodiment of the present disclosure.

FIG. 3 is a block diagram for describing a method of performing a low temperature management operation according to an embodiment of the present disclosure.

Referring to FIG. 3, the memory controller 200 may be connected to the memory device 100 implemented as a nonvolatile memory, and may access the memory device 100. For example, the memory controller 200 may control read, program, erase, and background operations of the memory device 100. The memory controller 200 may provide an interface between the memory device 100 and the host 300. The memory controller 200 may drive firmware for controlling the memory device 100.

The memory device 100 may include the memory cell array 110 including the plurality of memory cells, the control logic 140 that controls an overall operation of the memory device 100, and the peripheral circuit 170 that performs cell operations on the memory blocks included in the memory cell array 110. In an embodiment of the present disclosure, the cell operations on the memory blocks may be the read operation, the program operation, or the erase operation.

The control logic 140 may control the peripheral circuit 170 to perform the low temperature management operation of increasing the temperature of the memory device 100 based on the temperature information of the memory device 100. The control logic 140 may determine whether to increase the temperature of the memory device 100 based on the temperature information of the memory device 100.

The control logic 140 may include a temperature manager 141 that controls the peripheral circuit 170 in response to the low temperature management operation. The temperature manager 141 may determine whether to perform the low temperature management operation based on the temperature information of the memory device 100. The temperature manager 141 may control a connection circuit 171 included in the peripheral circuit 170 in response to the low temperature management operation.

In an embodiment of the present disclosure, the control logic 140 and the temperature manager 141 may be configured as a combination of hardware and software. The control logic 140 and the temperature manager 141 may include at least one or more electronic circuits that execute a predetermined program code.

The temperature manager 141 may control the peripheral circuit 170 to perform the low temperature management operation when the memory device is in an idle state and the temperature of the memory device is lower than a predetermined reference value. The low temperature management operation may include at least one of a dummy read operation not outputting a read value, a dummy program operation not storing data, or a dummy erase operation not erasing stored data.

The peripheral circuit 170 may generate operation voltages for the plurality of memory cells. The operation voltages may be voltages which are provided with the plurality of memory cells during the cell operations. The peripheral circuit 170 may transfer the operation voltages to the memory block through the bit lines and the word lines. The peripheral circuit 170 may include the connection circuit 171 that is connected to the word lines to transfer some of the operation voltages.

The temperature manager 141 may determine a target cell of the dummy read operation. The peripheral circuit 170 may generate read voltages corresponding to the dummy read operation. In an embodiment of the present disclosure, the read voltages may include a read operation voltage to be applied to the word line and a precharge voltage to be applied to the bit line. The peripheral circuit 170 may precharge a bit line corresponding to the target cell based on the read voltages. The peripheral circuit 170 may transfer the read operation voltage to the connection circuit 171. The temperature manager 141 may control the connection circuit 171 to limit transferal of the read operation voltage to a word line coupled to the target cell. The read operation voltage may be a local word line apply voltage.

The temperature manager 141 may determine the target cell of the dummy program operation. The peripheral circuit 170 may generate program voltages corresponding to the dummy program operation. In an embodiment of the present disclosure, the program voltages may include a program operation voltage to be applied to the word line and a precharge voltage to be applied to the bit line. The peripheral circuit 170 may precharge the bit line corresponding to the target cell based on the program voltages. The peripheral circuit 170 may perform a verify operation based on the precharged bit line. The peripheral circuit 170 may transfer the program operation voltage to the connection circuit 171. The temperature manager 141 may control the connection circuit 171 to limit transferal of the program operation voltage to a word line coupled to the target cell. The program operation voltage may be a local word line apply voltage. In an embodiment of the present disclosure, the dummy program operation may include verify operations performed in a plurality of program loops. The peripheral circuit 170 may precharge the bit line of the target cell during the verify operation. The temperature manager 141 may control a verify operation which is performed by the peripheral circuit 170 to be passed in a last program loop of the plurality of program loops, among the verify operations.

The temperature manager 141 may determine a target cell of the dummy erase operation. The peripheral circuit 170 may generate erase voltages corresponding to the dummy erase operation. In an embodiment of the present disclosure, the erase voltages may include an erase operation voltage to be applied to a well of the memory device and a precharge voltage to be applied to the bit line. The peripheral circuit 170 may precharge the bit line corresponding to the target cell based on the erase voltages. The peripheral circuit 170 may perform the verify operation based on the precharged bit line. The temperature manager 141 may limit transferal of the erase operation voltage to a word line coupled to the target cell. The erase operation voltage may be a local word line apply voltage.

In an embodiment of the present disclosure, the dummy erase operation may include verify operations performed in a plurality of erase loops. The peripheral circuit 170 may precharge the bit line of the target cell during the verify operation. The temperature manager 141 may control the peripheral circuit 170 to perform an erase verify operation in a last erase loop among the plurality of erase loops.

In an embodiment of the present disclosure, the temperature manager 141 may control the peripheral circuit 170 to perform the low temperature management operation when the memory device 100 is in the idle state and the temperature of the memory device 100 is lower than the predetermined reference value. The temperature manager 141 may control the peripheral circuit 170 to perform the dummy read operation in response to the temperature of the memory device 100, the temperature being lower than the predetermined reference value. The temperature manager 141 may determine whether to perform the dummy erase operation based on the temperature information of the memory device 100 on which the dummy read operation is performed. When the temperature of the memory device 100 on which the dummy read operation is performed is within a first range, the temperature manager 141 may control the peripheral circuit 170 to perform the dummy erase operation. After the dummy erase operation is performed, the temperature manager 141 may control the peripheral circuit 170 to perform the dummy program operation.

In another embodiment of the present disclosure, when the temperature of the memory device 100 on which the dummy read operation is performed is within a second range, the temperature manager 141 may control the peripheral circuit 170 to perform the dummy program without performing the dummy erase operation. In response to the temperature of the memory device 100 exceeding the predetermined reference value, the temperature manager 141 may stop the low temperature management operation. In an embodiment of the present disclosure, a maximum value of the first range may be less than a minimum value of the second range.

In an embodiment of the present disclosure, according to the temperature of the memory device 100, the low temperature management operation may include only the dummy read operation, include the dummy read operation and the dummy program operation, or include the dummy read operation, the dummy erase operation, and the dummy program. The temperature manager 141 may determine whether to perform the dummy erase operation and the dummy program operation based on the temperature information of the memory device 100 on which the dummy read operation is performed.

The temperature manager 141 may determine whether to additionally perform the low temperature management operation based on the temperature information of the memory device 100 on which the low temperature management operation is performed. In response to the temperature of the memory device 100, on which the low temperature management operation is performed, the temperature being lower than the predetermined reference value, the temperature manager 141 may control the peripheral circuit 170 to additionally perform the low temperature management operation.

The temperature manager 141 may determine the target cell, on which the low temperature management operation is performed, among the plurality of memory cells included in the memory device 100. For example, the temperature manager 141 may randomly determine the target cell among the plurality of memory cells in response to the temperature of the memory device 100, the temperature being lower than the predetermined reference value. In an embodiment of the present disclosure, the temperature manager 141 may determine the target cell in consideration of an effect on performance of the memory device 100. For example, the temperature manager 141 may determine, as the target cell of the low temperature management operation, a memory cell close to a portion where the temperature of the memory device 100 is low. Alternatively, the temperature manager 141 may determine the target cell based on the number of times that operations are performed on memory cells during a predetermined time.

The temperature manager 141 may perform a plurality of low temperature management operations on one target cell. In an embodiment of the present disclosure, the target cell of the dummy read operation, the dummy program operation, and the dummy erase operation may be the same cell.

The temperature manager 141 may change the target cell whenever the low temperature management operation is performed. The temperature manager 141 may determine a new target cell among the plurality of memory cells. The temperature manager 141 may differently determine the target cell of the dummy read operation, the dummy program operation, and the dummy erase operation.

In another embodiment of the present disclosure, the temperature manager 141 may perform the dummy read operation on the first cell, perform the dummy program operation on a second cell, and perform the dummy erase operation on a third cell.

The memory controller 200 may control background operations of the memory device 100 related to the low temperature management operation. The memory controller 200 may adjust a performance range of the background operation of the memory device 100 based on the temperature information of the memory device 100.

For example, the memory controller 200 may relieve a background operation condition in response to the temperature of the memory device 100, the temperature being lower than the predetermined reference value. The memory controller 200 may cause the background operation of the memory device 100 to increase the temperature of the memory device 100. Specifically, the memory controller 200 may lower a reference value of read reclaim or garbage collection.

In an embodiment of the present disclosure, the memory controller 200 may omit updating of map data corresponding to the low temperature management operation. Since the operation voltages are not applied to the word line of the memory block, cell stress may not be increased.

The dummy read operation, the dummy program operation, and the dummy erase operation may be performed as the low temperature management operation. Since the dummy read operation does not increase the number of times of reading memory cells, the number of times being written in the map data, the dummy program operation does not store data in the memory cells, and the dummy erase operation does not erase stored data, the map data may not be changed by performance of the low temperature management operation. The low temperature management operation may not change data stored in the memory device 100 while increasing the temperature of the memory device 100.

The connection circuit 171 may include pass transistors connected to each of the plurality of memory cells through the word lines. The temperature manager 141 may turn off the pass transistors in response to the low temperature management operation. When the pass transistors are turned off, the generated operation voltages may not be applied to the memory block.

During the dummy read operation, the temperature manager 141 may turn off the pass transistors to limit transferal of the read operation voltage and the pass voltage. During the dummy program operation, the temperature manager 141 may turn off the pass transistors to limit transferal of the program operation voltage and the pass voltage. During the dummy erase operation, the temperature manager 141 may limit the application of the erase voltage to the well of the memory device 100.

In another embodiment of the present disclosure, the temperature manager 141 may be included in the memory controller 200. The temperature manager 141 shown in FIG. 3 is only one of various embodiments of the present disclosure, and the temperature manager included in the memory controller 200 may determine whether to perform the low temperature management operation.

Specifically, the temperature manager may determine whether to perform the low temperature management operation and the target cell on which the low temperature management operation is to be performed, based on the temperature information of the memory device 100. The temperature manager may determine, as the low temperature management operation on the target cell, to perform at least one of the dummy read operation, the dummy program operation, and the dummy erase operation. The temperature manager may transmit a command for the low temperature management operation to the memory device 100. The control logic 140 may control the peripheral circuit 170 to perform the low temperature management operation based on the command received from the temperature manager.

Figure 4:
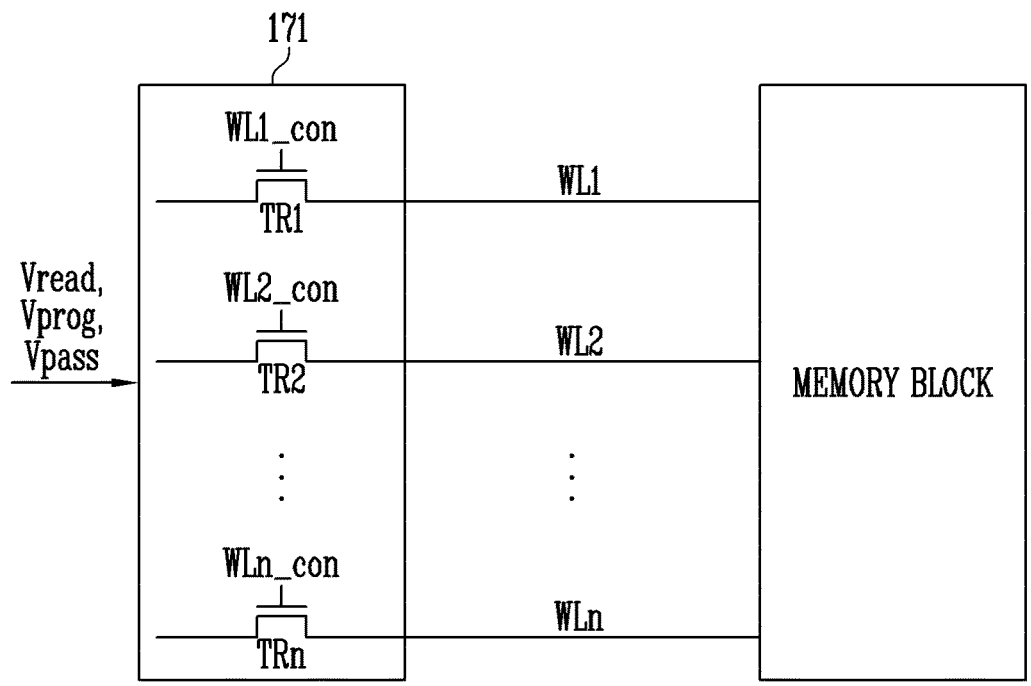
FIG. 4 is a detailed diagram illustrating a connection circuit according to an embodiment of the present disclosure.

FIG. 4 is a detailed diagram illustrating the connection circuit 171 according to an embodiment of the present disclosure.

Referring to FIG. 4, the connection circuit 171 may include the pass transistors TR1, TR2, . . . , TRn connected to each of the plurality of memory cells through the word lines. The connection circuit 171 may include n pass transistors TR1, TR2, . . . , TRn. The n pass transistors TR1, TR2, . . . , TRn may transfer a local word line apply voltage to each of the memory cells. A local word line may be a word line between each of the pass transistors and each of the plurality of memory cells. The local word line apply voltage may be a voltage which is applied to each of the plurality of memory cells through the local word line.

The connection circuit 171 may receive the read voltage, the program voltage, and the pass voltage generated by the peripheral circuit. In an embodiment of the present disclosure, the read operation voltage of the dummy read operation, the program operation voltage of the dummy program operation, the pass voltage applied to unselected memory cells may be transferred to the connection circuit 171.

The pass transistors TR1, TR2, . . . , TRn included in the connection circuit 171 may be turned off by control signals WL1_con, WL2_con, . . . , and WLn_con received from the temperature manager 141. The connection circuit 171 may limit transferal of the operation voltages to the memory block in response to the low temperature management operation.

In an embodiment of the present disclosure, the connection circuit 171 may turn off the pass transistors TR1, TR2, . . . , TRn during the dummy read operation. When the dummy read operation is performed, the read operation voltage and the pass voltage may be transferred to the connection circuit 171. The connection circuit 171 may limit transferal of the read operation voltages to a gate of the target cell through the word lines and may limit transferal of the pass voltages to a gate of the unselected memory cells.

When the pass transistors TR1, TR2, . . . , TRn are turned off by the control signals WL1_con, WL2_con, . . . , and WLn_con, transferal of the read operation voltage and the pass voltage may be limited. The word line voltages transferred to the memory block may be limited, but the precharge voltage applied through the bit lines is not limited, and thus the temperature of the memory device 100 may be increased.

In an embodiment of the present disclosure, the connection circuit 171 may turn off the pass transistors TR1, TR2, . . . , TRn during the dummy program operation. When the dummy program operation is performed, the program operation voltage and the pass voltage may be transferred to the connection circuit 171. The connection circuit 171 may limit transferal of the program operation voltage to the gate of the target cell through the word lines and may limit transferal of the pass voltage to the gate of the unselected memory cells.

When the pass transistors TR1, TR2, . . . , TRn are turned off by the control signals WL1_con, WL2_con, . . . , and WLn_con, transferal of the program operation voltage and the pass voltage may be limited. The word line voltages transferred to the memory block may be limited, but the precharge voltage applied through the bit lines may not be limited, and thus the temperature of the memory device 100 may be increased.

The verify operations included in the dummy program operation and the dummy erase operation may include a bit line precharge operation. The temperature of the memory device 100 may be increased due to the bit line precharge operation.

In an embodiment of the present disclosure, the temperature manager 141 may control the peripheral circuit 170 so that the program operation or the erase operation is passed in the last loop among the plurality of loops.

Figure 5:
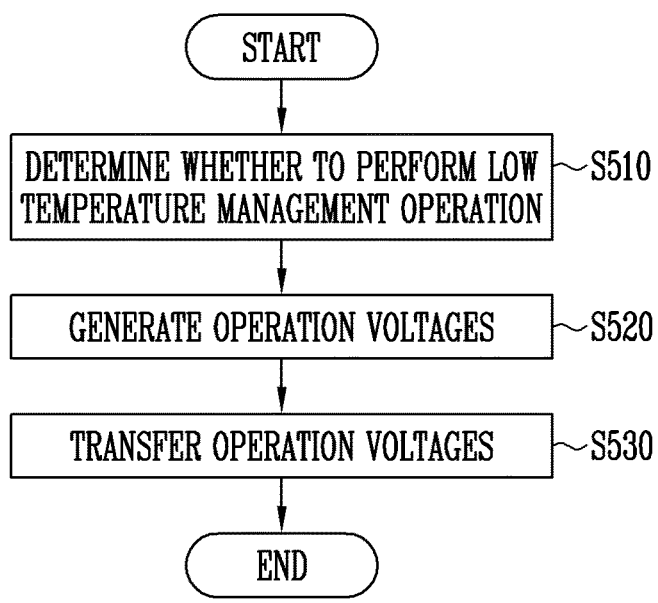
FIG. 5 is a flowchart for describing a method of performing a low temperature management operation according to an embodiment of the present disclosure.

FIG. 5 is a flowchart for describing a method of performing a low temperature management operation according to an embodiment of the present disclosure.

Referring to FIG. 5, the control logic may perform the low temperature management operation based on the temperature information of the memory device to increase the temperature of the memory device. The control logic may stop the low temperature management operation when the temperature of the memory device exceeds the predetermined reference value. The control logic may control the peripheral circuit to additionally perform the low temperature management operation until the temperature of the memory device reaches the predetermined reference value.

In operation S510, the temperature manager may determine whether to perform the low temperature management operation. The temperature manager may control the peripheral circuit in response to the low temperature management operation. The temperature manager may determine, based on the temperature information of the memory device, whether to perform the low temperature management operation. The temperature manager may control the connection circuit included in the peripheral circuit in response to the low temperature management operation.

In operation S520, the peripheral circuit may generate the operation voltages corresponding to the low temperature management operation. The peripheral circuit may generate the operation voltages for the plurality of memory cells. The peripheral circuit may transfer the operation voltages to the memory block through the bit lines and the word lines. The peripheral circuit may include the connection circuit connected to the word lines to transfer the operation voltages.

The temperature manager may determine the target cell of the dummy read operation. The peripheral circuit may generate the read voltages corresponding to the dummy read operation. In an embodiment of the present disclosure, the read voltages may include the read operation voltage applied to the word line and the precharge voltage applied to the bit line.

The temperature manager may determine the target cell of the dummy program operation. The peripheral circuit may generate the program voltages corresponding to the dummy program operation. In an embodiment of the present disclosure, the program voltages may include the program operation voltage applied to the word line and the precharge voltage applied to the bit line.

In an embodiment of the present disclosure, the dummy program operation may include the verify operations performed in the plurality of program loops. The peripheral circuit may precharge the bit line of the target cell during the verify operation. The temperature manager may control a verify operation which is performed by the peripheral circuit to be passed in the last program loop of the plurality of program loops, among the verify operations.

The temperature manager may determine the target cell of the dummy erase operation. The peripheral circuit may generate the erase voltages corresponding to the dummy erase operation. In an embodiment of the present disclosure, the erase voltages may include the erase operation voltage applied to the well of the memory device and the precharge voltage applied to the bit line. The peripheral circuit may precharge the bit line corresponding to the target cell based on the erase voltages. The peripheral circuit may perform the verify operation based on the precharged bit line.

In operation S530, the peripheral circuit may transfer the generated operation voltages to the memory block. The peripheral circuit may transfer the read operation voltage to the connection circuit. The temperature manager may control the connection circuit to limit transferal of the read operation voltage to a word line coupled to the target cell. The peripheral circuit may transfer the program operation voltage to the connection circuit. The temperature manager may control the connection circuit to limit transferal of the program operation voltage to a word line coupled to the target cell. The temperature manager may limit transferal of the erase operation voltage to a word line coupled to the target cell.

In an embodiment of the present disclosure, the memory controller may omit updating of map data corresponding to the low temperature management operation. Since the operation voltages are not applied to the word line of the memory block, cell stress may not be increased.

Figure 6:
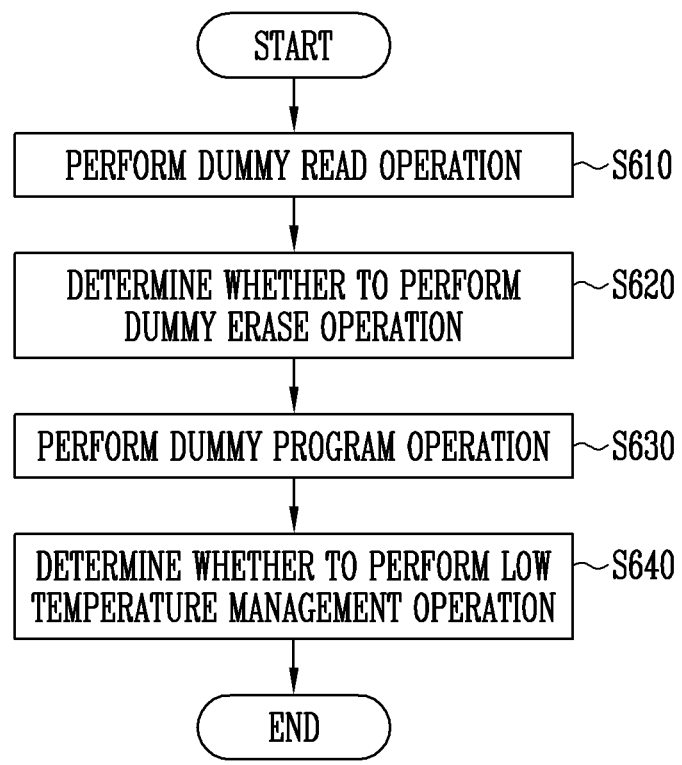
FIG. 6 is a flowchart for describing a method of performing a low temperature management operation based on temperature information of a memory device according to an embodiment of the present disclosure.

FIG. 6 is a flowchart for describing a method of performing a low temperature management operation based on temperature information of a memory device according to an embodiment of the present disclosure.

Referring to FIG. 6, the temperature manager may control, based on the temperature information of the memory device, the peripheral circuit to perform the low temperature management operation. According to performance of the low temperature management operation, the temperature of the memory device may be increased. The temperature manager may perform the low temperature management operation until the temperature of the memory device reaches a predetermined temperature. The low temperature management operation may include at least one of the dummy read operation not outputting the read value, the dummy program operation not storing data, and the dummy erase operation not erasing stored data.

In operation S610, the temperature manager may control the peripheral circuit to perform the dummy read operation. The peripheral circuit may perform the dummy read operation not outputting the read value. The peripheral circuit may limit transferal of the local word line apply voltage to the memory block.

The temperature manager may control the peripheral circuit to perform the low temperature management operation when the memory device is in the idle state and the temperature of the memory device is lower than the predetermined reference value. The temperature manager may control the peripheral circuit to perform the dummy read operation in response to the temperature of the memory device, the temperature being lower than the predetermined reference value.

In operation S620, the temperature manager may determine, based on the temperature information of the memory device on which the dummy read operation is performed, whether to perform the dummy erase operation. When the temperature of the memory device on which the dummy read operation is performed is within the first range, the temperature manager may control the peripheral circuit to perform the dummy erase operation. After the dummy erase operation is performed, the temperature manager may control the peripheral circuit to perform the dummy program operation.

The erase voltages may include the erase operation voltage applied to the well of the memory device and the precharge voltage applied to the bit line. The peripheral circuit may precharge the bit line corresponding to the target cell based on the erase voltages. The peripheral circuit may perform the verify operation based on the precharged bit line.

In another embodiment of the present disclosure, when the temperature of the memory device on which the dummy read operation is performed is within the second range, the temperature manager may control the peripheral circuit to perform the dummy program operation without performing the dummy erase operation. In an embodiment of the present disclosure, the maximum value of the first range may be less than the minimum value of the second range.

In operation S630, the temperature manager may determine whether to perform the dummy program operation based on the temperature information of the memory device. The temperature manager may control the peripheral circuit to perform the dummy program operation in response to the temperature of the memory device, the temperature being lower than the predetermined reference value.

The peripheral circuit may generate the program voltages corresponding to the dummy program operation. In an embodiment of the present disclosure, the program voltages may include the program operation voltage applied to the word line and the precharge voltage applied to the bit line. The peripheral circuit may precharge the bit line corresponding to the target cell based on the program voltages. The peripheral circuit may perform the verify operation based on the precharged bit line.

In an embodiment of the present disclosure, the temperature manager may stop the low temperature management operation in response to the temperature of the memory device exceeding the predetermined reference value.

In operation S640, the temperature manager may determine, based on the temperature information of the memory device on which the low temperature management operation is performed, whether to additionally perform the low temperature management operation. The temperature manager may control the peripheral circuit to additionally perform the low temperature management operation in response to the temperature of the memory device, the temperature being lower than the predetermined reference value.

In an embodiment of the present disclosure, according to the temperature of the memory device, the low temperature management operation may include only the dummy read operation, include the dummy read operation and the dummy program operation, or include the dummy read operation, the dummy erase operation, and the dummy program operation. The temperature manager may determine whether to perform the dummy erase operation and the dummy program operation based on the temperature information of the memory device on which the dummy read operation is performed.

The temperature manager may determine whether to additionally perform the low temperature management operation based on the temperature information of the memory device on which the low temperature management operation is performed. The temperature manager may control the peripheral circuit to additionally perform the low temperature management operation in response to the temperature of the memory device, on which the low temperature management operation is performed, the temperature being lower than the predetermined reference value.

The temperature manager may determine the target cell on which the low temperature management operation is performed among the plurality of memory cells included in the memory device. The temperature manager may perform a plurality of low temperature management operations on one target cell. In an embodiment of the present disclosure, the target cell of the dummy read operation, the dummy program operation, and the dummy erase operation may be the same cell.

The temperature manager may change the target cell whenever the low temperature management operation is performed. The temperature manager may determine the new target cell among the plurality of memory cells. The temperature manager may differently determine the target cell of the dummy read operation, the dummy program operation, and the dummy erase operation.

In another embodiment of the present disclosure, the temperature manager may control peripheral circuit to perform the dummy read operation on the first cell, perform the dummy program operation on the second cell, and perform the dummy erase operation on the third cell.

The method of performing the low temperature management operation shown in FIG. 6 is only an embodiment of the present disclosure, and the low temperature management operation may be performed in various methods. The temperature manager may perform the low temperature management operation by combining at least one of the dummy read operation, the dummy program operation, or the dummy erase operation.

For example, the temperature manager may first perform the dummy program operation, and then perform the dummy read operation and the dummy erase operation. The temperature manager may perform the dummy read operation, the dummy program operation, and the dummy erase operation by changing an order.

In addition, the memory device may repeatedly perform one of the dummy read operation, the dummy program operation, or the dummy erase operation a plurality of times. For example, the dummy read operation may be repeatedly performed a plurality of times until the temperature of the memory device becomes higher than the predetermined reference value.

The temperature manager may perform different types of dummy operations according to a difference between a current temperature of the memory device and the predetermined reference value. Temperatures of the memory device which are increased may be different from each other among the dummy read operation, the dummy program operation, and the dummy erase operation. The temperature manager may perform more dummy program operations as the difference between the memory device and the predetermined reference value increases.

Figure 7:
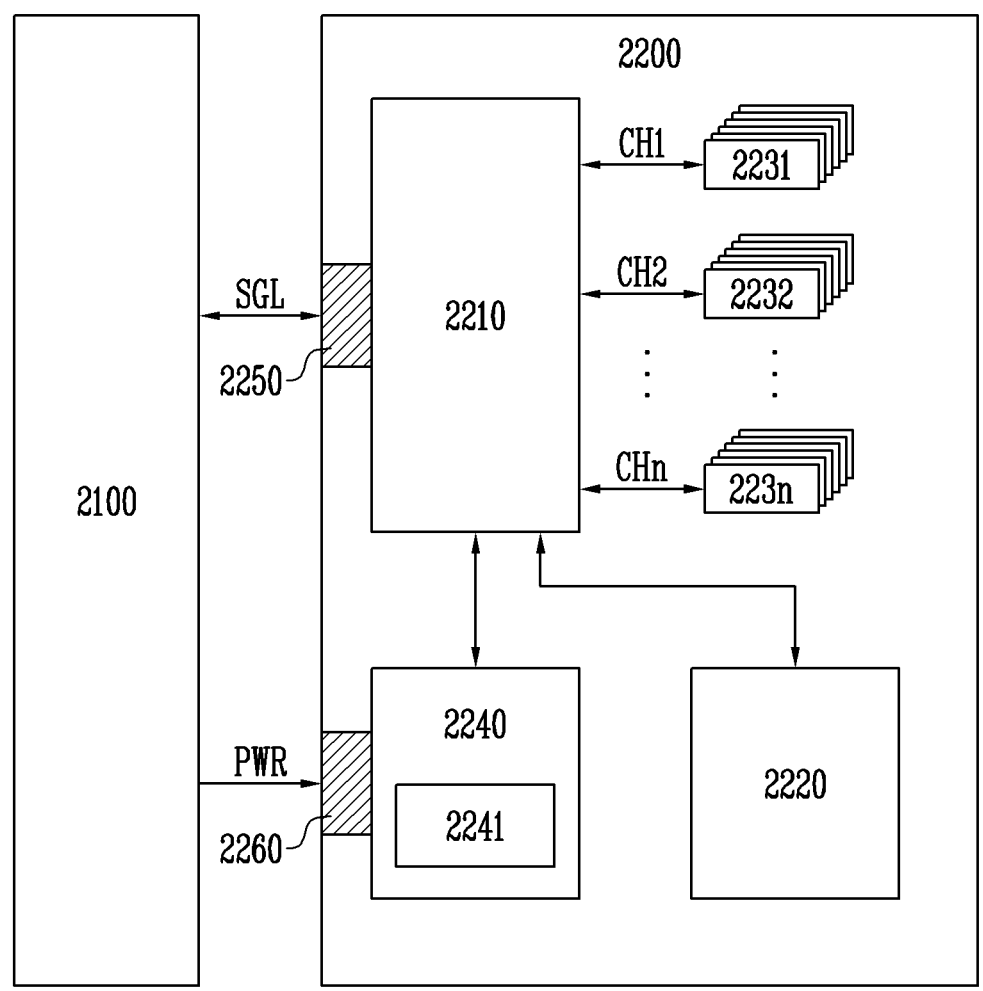
FIG. 7 is a diagram illustrating a data processing system including a solid state drive according to an embodiment of the present disclosure.

FIG. 7 is a diagram illustrating a data processing system 2000 including a solid state drive (SSD) according to an embodiment of the present disclosure.

Referring to FIG. 7, the data processing system 2000 may include a host 2100 and an SSD 2200.

The SSD 2200 may include a controller 2210, a buffer memory device 2220, nonvolatile memories 2231 to 223*n*, a power supply 2240, a signal connector 2250, and a power connector 2260.

The controller 2210 may control an overall operation of the SSD 2200. In an embodiment of the present disclosure, the controller 2210 may manage a temperature of the SSD 2200. The controller 2210 may control the SSD 2200 to perform a low temperature management operation of increasing the temperature of the SSD 2200 in response to the temperature of the SSD 2200, which is lower than a reference value.

The buffer memory device 2220 may temporarily store data to be stored in the nonvolatile memories 2231 to 223*n*. In addition, the buffer memory device 2220 may temporarily store data read from the nonvolatile memories 2231 to 223*n*. The data temporarily stored in the buffer memory device 2220 may be transmitted to the host 2100 or the nonvolatile memories 2231 to 223*n* under control of the controller 2210.

The nonvolatile memories 2231 to 223*n* may be used as a storage medium of the SSD 2200. Each of the nonvolatile memories 2231 to 223*n* may be connected to the controller 2210 through a plurality of channels CH1 to CHn. One or more nonvolatile memories may be connected to one channel. The nonvolatile memories connected to one channel may be connected to the same signal bus and data bus.

The power supply 2240 may provide power PWR input through the power connector 2260 into the SSD 2200. The power supply 2240 may include an auxiliary power supply 2241. The auxiliary power supply 2241 may supply power so that the SSD 2200 is normally ended when a sudden power off occurs. The auxiliary power supply 2241 may include large capacity capacitors capable of charging the power PWR.

The controller 2210 may transmit/receive a signal SGL with the host 2100 through the signal connector 2250. For example, the signal SGL may include a command, an address, data, and the like. The signal connector 2250 may be configured as various types of connectors according to an interface method between the host 2100 and the SSD 2200.

The scope of the present disclosure is indicated by the claims to be described later rather than the detailed description, and all changes or modifications derived from the meaning and scope of the claims and their equivalent concepts are interpreted as being included in the scope of the present disclosure.

Various embodiments of the present disclosure have been described in the drawings and specification. Although specific terminologies are used here, the terminologies are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein. The embodiments may be combined to form additional embodiments.

It should be noted that although the technical spirit of this disclosure has been described in connection with embodiments thereof, this is merely for description purposes and should not be interpreted as limiting. It should be appreciated by one of ordinary skill in the art that various changes may be made thereto without departing from the technical spirit of the disclosure and the following claims.

For example, for the logic gates and transistors provided as examples in the above-described embodiments, different positions and types may be implemented depending on the polarity of the input signal.

What is claimed is:

1. A memory device comprising:
a memory block including a plurality of memory cells;
a peripheral circuit configured to generate operation voltages for the plurality of memory cells and transfer the operation voltages to the memory block through bit lines and word lines, some of the operation voltages are applied to the plurality of memory cells through pass transistors connected to the word lines; and
a control logic configured to control, based on temperature information of the memory device, the peripheral circuit to perform a low temperature management operation of increasing a temperature of the memory device,
wherein the peripheral circuit limits transferal of a local word line apply voltage by turning off the pass transistors in response to the low temperature management operation, the local word line apply voltage being included in the operation voltages.

2. The memory device of claim 1,
wherein the peripheral circuit comprises a connection circuit including the pass transistors configured to transfer the operation voltages through the word lines, and
wherein the control logic comprises a temperature manager configured to:
determine whether to perform the low temperature management operation based on the temperature information, and
control the connection circuit in response to the low temperature management operation.

3. The memory device of claim 2,
wherein the temperature manager is further configured to control the peripheral circuit to perform the low temperature management operation when the memory device is in an idle state and the temperature is lower than a predetermined reference value, and
wherein the low temperature management operation includes at least one of a dummy read operation not outputting a read value, a dummy program operation not storing data, or a dummy erase operation not erasing stored data.

4. The memory device of claim 3,
wherein the temperature manager is further configured to determine a target cell of the dummy read operation,
wherein the temperature manager controls the connection circuit to limit transferal of a read operation voltage to the word line coupled to the target cell, the read operation voltage corresponding to the dummy read operation, and
wherein the peripheral circuit generates, as the operation voltages, read voltages corresponding to the dummy read operation and including the read operation voltage, precharges a bit line corresponding to the target cell based on the read voltages and transfers the read operation voltage to the connection circuit.

5. The memory device of claim 3,
wherein the temperature manager is further configured to determine a target cell of the dummy program operation,
wherein the temperature manager controls the connection circuit to limit transferal of a program operation voltage to the word line coupled to the target cell, the program operation voltage corresponding to the dummy program operation, and
wherein the peripheral circuit generates, as the operation voltages, program voltages corresponding to the dummy program operation and including the program operation voltage, precharges a bit line corresponding to the target cell based on the program voltages and transfers the program operation voltage to the connection circuit.

6. The memory device of claim 5,
wherein the dummy program operation includes verify operations performed in a plurality of program loops, and
wherein the temperature manager controls a verify operation which is performed by the peripheral circuit to be passed in a last program loop of the plurality of program loops, among the verify operations.

7. The memory device of claim 3,
wherein the temperature manager is further configured to determine a target cell of the dummy erase operation,
wherein the temperature manager limits transferal of an erase operation voltage to the word line coupled to the target cell, the erase operation voltage corresponding to the dummy erase operation, and
wherein the peripheral circuit generates, as the operation voltages, erase voltages corresponding to the dummy erase operation and including the erase operation voltage, and precharges a bit line corresponding to the target cell based on the erase voltages.

8. The memory device of claim 7,
wherein the dummy erase operation includes verify operations performed in a plurality of erase loops, and
wherein the temperature manager controls a verify operation which is performed by the peripheral circuit to be passed in a last erase loop of the plurality of erase loops, among the verify operations.

9. The memory device of claim 2,
wherein the connection circuit includes pass transistors connected to the plurality of memory cells through the word lines, and
wherein the temperature manager turns off the pass transistors in response to the low temperature management operation.

10. A storage device comprising:
a memory block including a plurality of memory cells;
a peripheral circuit configured to generate operation voltages for the plurality of memory cells and transfer the operation voltages to the memory block through bit lines and word lines, some of the operation voltages are applied to the plurality of memory cells through pass transistors connected to the word lines;
a control logic configured to control the peripheral circuit to perform a low temperature management operation; and
a memory controller configured to output, to a memory device, a command for controlling operations of the memory device based on temperature information of the memory device,
wherein the peripheral circuit limits, based on the command, transferal of a local word line apply voltage by turning off the pass transistors, the local word line apply voltage being included in the operation voltages for the low temperature management operation.

11. The storage device of claim 10,
wherein the peripheral circuit includes a connection circuit including the pass transistors configured to transfer the operation voltages through the word lines,
wherein the memory controller includes a temperature manager configured to:
determine whether to perform the low temperature management operation based on the temperature information, and
output, to the memory device, the command for the low temperature management operation, and
wherein the control logic controls the connection circuit in response to the command for the low temperature management operation.

12. The storage device of claim 11,
wherein the temperature manager is further configured to control the peripheral circuit to perform the low temperature management operation when the memory device is in an idle state and a temperature of the memory device is lower than a predetermined reference value, and
wherein the low temperature management operation includes at least one of a dummy read operation not outputting a read value, a dummy program operation not storing data, or a dummy erase operation not erasing stored data.

13. The storage device of claim 12, wherein the temperature manager is further configured to determine whether to perform an additional low temperature management operation based on the temperature information of the memory device on which the low temperature management operation is performed.

14. The storage device of claim 12, wherein the memory controller omits updating of map data corresponding to the low temperature management operation.

15. The storage device of claim 12, wherein the memory controller is further configured to change the predetermined reference value based on the temperature information.

16. A method of operating a memory device, the method comprising:
performing, based on temperature information of the memory device, a low temperature management operation of increasing a temperature of the memory device;
generating operation voltages for a plurality of memory cells included in the memory device; and
transferring the operation voltages to the plurality of memory cells through bit lines and word lines,
wherein some of the operation voltages are applied to the plurality of memory cells through pass transistors connected to the word lines;
wherein the transferring includes limiting transferal of a local word line apply voltage by turning off the pass transistors in response to the low temperature management operation, the local word line apply voltage being included in the operation voltages.

17. The method of claim 16,
wherein the low temperature management operation is performed when the memory device is in an idle state and the temperature is lower than a predetermined reference value, and
wherein the low temperature management operation includes at least one of a dummy read operation not outputting a read value, a dummy program operation not storing data, or a dummy erase operation not erasing stored data.

18. The method of claim 17,
wherein the performing of the low temperature management operation includes determining a target cell of the low temperature management operation,
wherein the operation voltages include at least one of read voltages corresponding to the dummy read operation, program voltages corresponding to the dummy program operation, and erase voltages corresponding to the dummy erase operation, and
wherein the transferring of the operation voltages further comprises limiting transferal of at least one of a read operation voltage, a program operation voltage, or an erase operation voltage to be provided to the word line coupled to the target cell.

19. The method of claim 18, wherein performing the low temperature management operation further comprises performing an additional low temperature management operation based on the temperature information of the memory device on which the low temperature management operation is performed.

* * * * *